(12) United States Patent
Hirschmuller et al.

(10) Patent No.: US 8,287,777 B2
(45) Date of Patent: Oct. 16, 2012

(54) METHOD OF PROTECTING ORGANIC MATERIAL FROM LIGHT

(75) Inventors: Isabel Annelies Marika Hirschmuller, Mulhouse (FR); Jürg Zingg, Reinach (CH)

(73) Assignee: BASF SE, Ludwigshafen (DE)

( * ) Notice: Subject to any disclaimer, the term of this patent is extended or adjusted under 35 U.S.C. 154(b) by 211 days.

(21) Appl. No.: 12/308,727

(22) PCT Filed: Jul. 2, 2007

(86) PCT No.: PCT/EP2007/056616
§ 371 (c)(1), (2), (4) Date: Sep. 2, 2009

(87) PCT Pub. No.: WO2008/006722
PCT Pub. Date: Jan. 17, 2008

(65) Prior Publication Data
US 2010/0006806 A1     Jan. 14, 2010

(30) Foreign Application Priority Data

Jul. 10, 2006 (EP) .................................. 06116900

(51) Int. Cl.
| F21V 9/04 | (2006.01) |
| F21V 9/06 | (2006.01) |
| G02B 5/22 | (2006.01) |
| G02B 5/26 | (2006.01) |
| B29D 22/00 | (2006.01) |
| B29D 23/00 | (2006.01) |
| B32B 1/08 | (2006.01) |
| B32B 27/08 | (2006.01) |

(52) U.S. Cl. ...... 252/589; 428/34.3; 428/35.2; 428/35.7
(58) Field of Classification Search .................. 252/589; 206/204; 383/109; 626/126–127; 428/131, 428/192, 215, 34.3, 35.3, 35.4, 35.7, 464, 428/507, 513, 514, 537.5, 81, 457, 461, 462, 428/35.2
See application file for complete search history.

(56) References Cited

U.S. PATENT DOCUMENTS

| 2003/0091764 A1* | 5/2003 | Fujii et al. ................... 428/35.2 |
| 2004/0191447 A1* | 9/2004 | Andrews et al. ............. 428/35.7 |
| 2005/0058846 A1* | 3/2005 | Matsui et al. ................ 428/480 |

FOREIGN PATENT DOCUMENTS

| DE | 27 39 041 | 3/1978 |
| GB | 1076635 | 7/1967 |
| GB | 1 552 514 | 9/1979 |

OTHER PUBLICATIONS

Patent abstracts of Japan AN 08102296.
Derwent Abstract No. 1996-248960 [25] of JP 08102296.
Patent abstracts of Japan AN 09047215.
Derwent Abstract No. 1997-186921 [17] of JP 9047215.

* cited by examiner

Primary Examiner — Bijan Ahvazi
(74) Attorney, Agent, or Firm — Tyler A. Stevenson

(57) ABSTRACT

The present invention relates to a method of protecting organic material, especially from the pharmaceuticals and foodstuffs sectors, against light, wherein at least one pigment of formula (1), (2), (3), (4), (5), (6) and (7) and (8) as defined in claim 1 and optionally a UV absorber as well as optionally further pigments and/or colorants is applied to or incorporated in a carrier material and the carrier material so treated is positioned between the light source and the organic material to be protected.

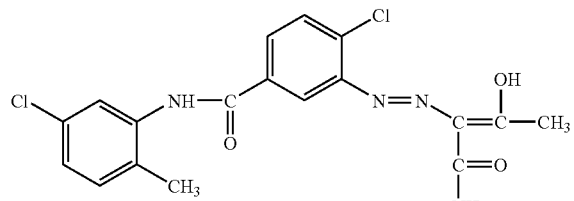

(1)

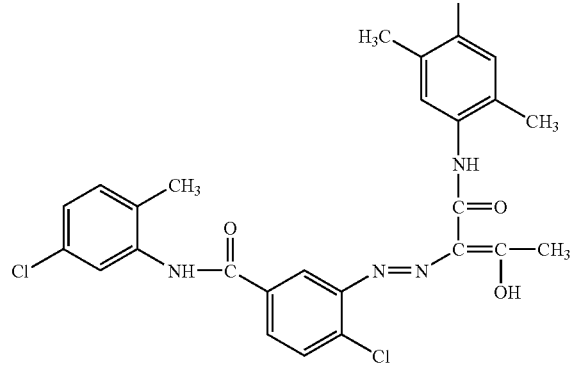

(2)

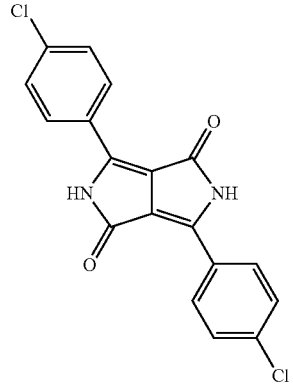

-continued
(3)
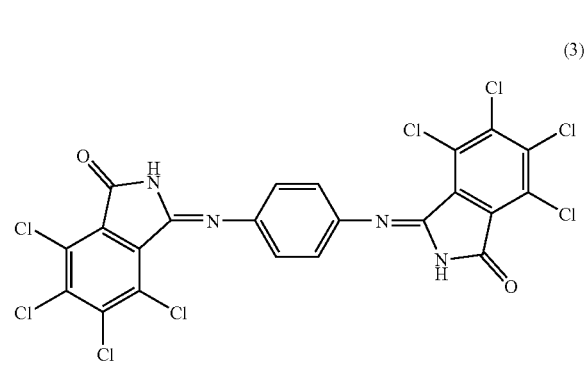
(4)
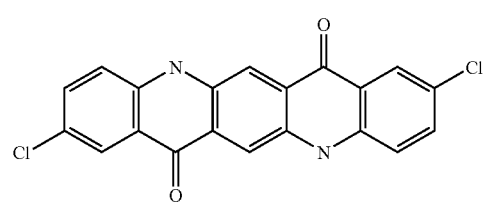
(5)
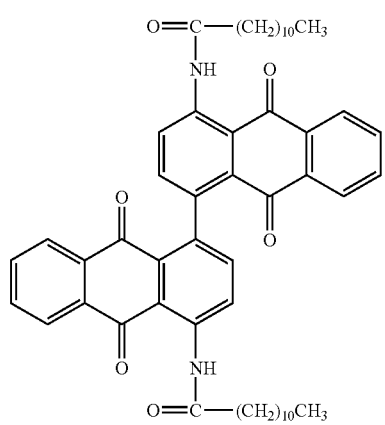
-continued
(6)
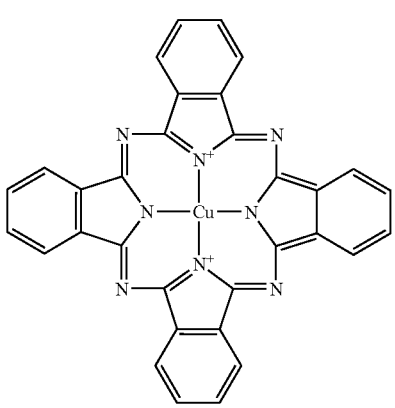
(7)
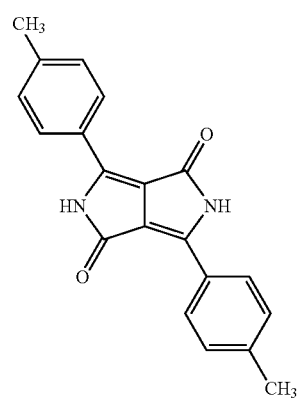
(8)
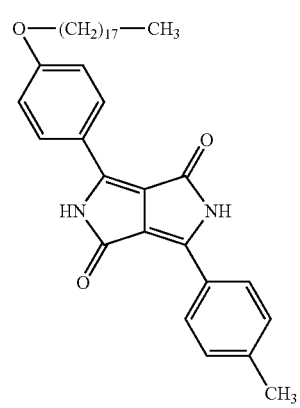
6 Claims, No Drawings

METHOD OF PROTECTING ORGANIC MATERIAL FROM LIGHT

The present invention relates to a method of protecting organic material from the damage which can be caused by daylight ("visible light") and, especially, by artificial light.

Organic material, for example pharmaceuticals or, especially, organic material from the food-stuffs sector, for example vegetables, fruit and meat, contains organic substances that are sensitive to light irradiation, especially in the short-wave region of daylight (up to 500 nm) and in the UV region.

The spectra of daylight and artificial light are different. For example, in the spectrum of a neon tube the proportion of UV between 250 and 400 nm is smaller than that in daylight, but the proportion of light with extinction between 400 and 500 nm, with a maximum at about 480 nm (blue region), is significantly greater than in the case of daylight.

Many foodstuffs, for example fruit, meat, milk, beer and mushrooms, contain vitamin B2, which is known to be very sensitive to UV light as well as to daylight up to 500 nm. Vitamin B2, also known as riboflavin, is present in high concentrations particularly in eggs, milk, liver, cheese and fish.

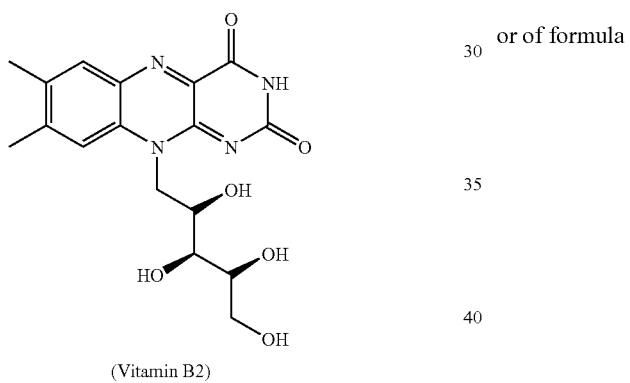

(Vitamin B2)

The light-sensitivity of riboflavin is also one of the reasons why milk, for example, is predominantly stored and sold in light-impermeable tetrapacks or in white-coloured bottles. Other vitamins, such as vitamin A, vitamin C, vitamin D and vitamin E, also exhibit high light-sensitivity to a greater or lesser extent.

The use of a small range of colorants as well as, especially, UV absorbers for light-protection in the foodstuffs industry is known per se. It has been found, however, that the commercially available UV absorbers exhibit action only in the spectral region between about 300 and 400 nm and not in the likewise critical spectral region between 400 and 500 nm.

There therefore continues to be a need for better protection of organic material from the damaging effect of light across the entire critical spectral region.

It has now been found, surprisingly, that the method according to the invention largely fulfils the criterion mentioned above.

The present invention accordingly relates to a method of protecting organic material, especially from the pharmaceuticals and foodstuffs sectors, against light, wherein at least one pigment of formula

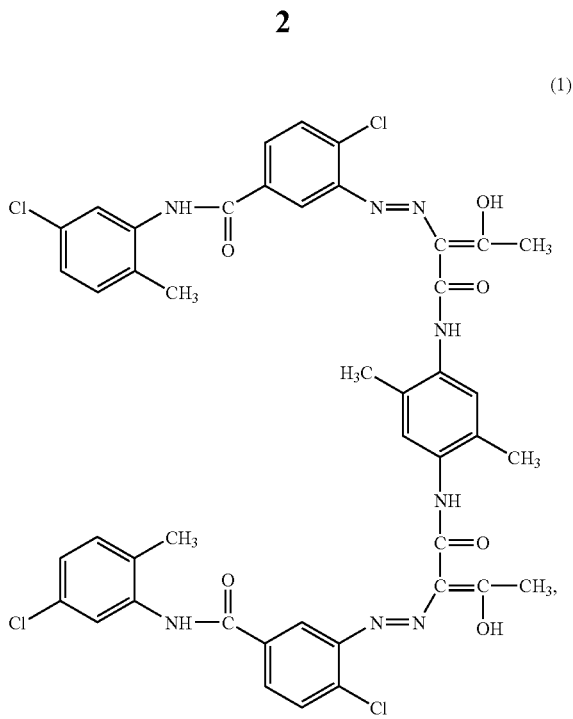

(1)

or of formula

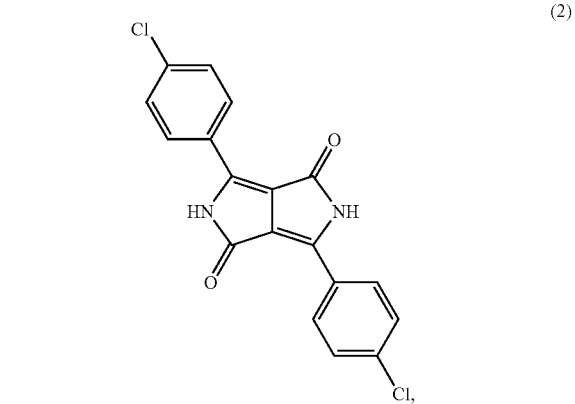

(2)

or of formula

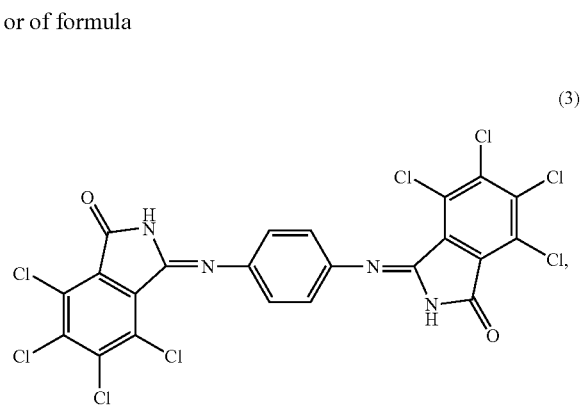

(3)

or of formula (4)

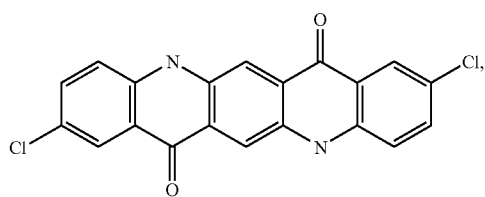

or of formula (5)

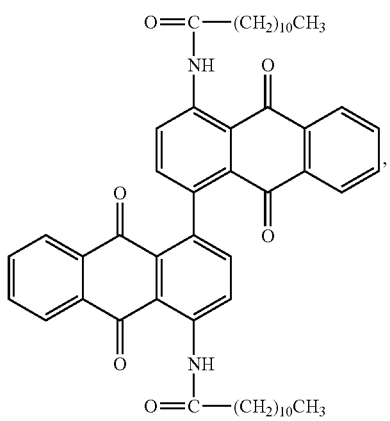

or of formula (6)

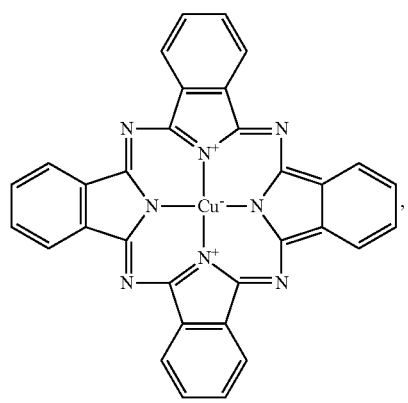

or a mixture of the pigments of formulae (7)

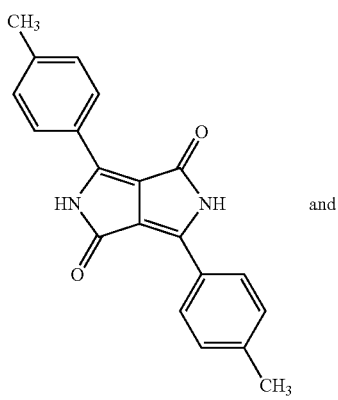

and

-continued (8)

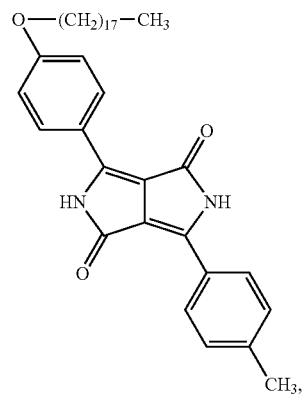

and optionally a UV absorber is applied to or incorporated in a carrier material and the carrier material so treated is positioned between the light source and the organic material to be protected.

It is preferred to use in the method according to the invention a combination of a pigment of formula (1) and a pigment of formula (2) and optionally a UV absorber.

It is preferable to use in the method according to the invention a combination of at least one pigment of formula (1), (2), (3), (4), (5), (6) and (7) and (8) and a UV absorber.

In the method according to the invention, apart from the pigments of formulae (1), (2), (3), (4), (5), (6) and (7) and (8) it is also possible for other pigments or colorants to be present.

The amounts in which the pigments used or the combination used are admixed with the carrier material or applied to the carrier material can vary within wide limits; generally amounts of from 0.001 to 5% by weight, especially from 0.01 to 2% by weight, more especially from 0.03 to 0.5% by weight, based on the carrier material, have proved advantageous.

As UV absorbers suitable for the method according to the invention there may be mentioned especially 2-(2'-hydroxyphenyl)benzotriazoles, 2-hydroxybenzophenones, esters of substituted or unsubstituted benzoic acid, acrylates, oxamides, 2-(2-hydroxyphenyl)-1,3,5-triazines, resorcinol monobenzoates or formamidines, as well as a polyester UV absorber of formula (9)

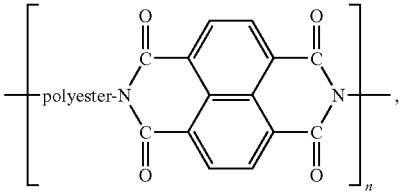

having a specific weight of from 1200 to 1400, preferably from 1300 to 1350, at 25° C.

From the class of 2-(2'-hydroxyphenyl)benzotriazoles there may be mentioned, for example, 2-(2'-hydroxy-5'-methylphenyl)benzotriazole, 2-(3',5'-di-tert-butyl-2'-hydroxyphenyl)benzotriazole, 2-(5'-tert-butyl-2'-hydroxyphenyl) benzotriazole, 2-(2'-hydroxy-5'-(1,1,3,3-tetramethyl-butyl) phenyl)benzotriazole, 2-(3',5'-di-tert-butyl-2'-hydroxyphenyl)-5-chlorobenzotriazole, 2-(3'-tert-butyl-2'- hydroxy-5'-methylphenyl)-5-chlorobenzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3',5'-bis(α,α-dimethyl benzyl)-2'-hydroxyphenyl)-benzotriazole, 2-(3'-tert-butyl-2'-hydroxy-5'-(2-octyloxycarbonylethyl)phenyl)-5-chlorobenzotriazole, 2-(3'-tert-butyl-5'-[2-(2-ethylhexyloxy)carbonylethyl]-2'-hydroxyphenyl)-5-chlorobenzotriazole, 2-(3'-tert-butyl-2'-hydroxy-5'-(2-methoxycarbonylethyl)phenyl)-5-chlorobenzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy)carbonylethyl]-2'-hydroxyphenyl)benzotriazole, 2-(3'-dodecyl-2'-hydroxy-5'-methylphenyl)benzotriazole, 2-(3'-tert-butyl-2'-hydroxy-5'-(2-isooctyloxycarbonylethyl)phenyl-benzotriazole, 2,2'-methylene-bis[4-(1,1,3,3-tetramethylbutyl)-6-benzotriazol-2-ylphenol]; the transesterification product of 2-[3'-tert-butyl-5'-(2-methoxycarbonylethyl)-2'-hydroxyphenyl]-2H-benzotriazole with polyethylene glycol 300; (R—CH$_2$CH$_2$—COO—CH$_2$CH$_2$—)$_2$ in which R=3'-tert-butyl-4'-hydroxy-5'-2H-benzotriazol-2-yl-phenyl; 2-[2'-hydroxy-3'-(α,α-dimethyl benzyl)-5'-(1,1,3,3-tetramethylbutyl)phenyl]benzotriazole; and 2-[2'-hydroxy-3'-(1,1,3,3-tetramethyl-butyl)-5'-(α,α-dimethylbenzyl)phenyl]benzotriazole.

From the class of 2-hydroxybenzophenones there may be mentioned, for example, the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

From the class of 2-(2-hydroxyphenyl)-1,3,5-triazines there may be mentioned, for example, 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropyloxy)-phenyl]-4,6-bis(2,4-dimethylphenyl)-1,3,5-triazine, 2-[2-hydroxy-4-(2-hydroxy-3-octyloxy-propyloxy)phenyl]-4,6-bis(2,4-dimethylphenyl)-1,3,5-triazine, 2-[4-(dodecyloxy/tridecyloxy-2-hydroxypropoxy)-2-hydroxyphenyl]-4,6-bis(2,4-dimethylphenyl)-1,3,5-triazine, 2-[2-hydroxy-4-(2-hydroxy-3-dodecyloxypropoxy)phenyl]-4,6-bis(2,4-dimethylphenyl)-1,3,5-triazine, 2-(2-hydroxy-4-hexyloxy)phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxypropoxy)phenyl]-1,3,5-triazine and 2-(2-hydroxyphenyl)-4-(4-methoxyphenyl)-6-phenyl-1,3,5-triazine.

From the class of oxamides there may be mentioned, for example, 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethyloxanilide and a mixture thereof with 2-ethoxy-2'-ethyl-5,4'-di-tert-butox-anilide and mixtures of o- and p-methoxy-disubstituted oxanilides and mixtures of o- and p-ethoxy-disubstituted oxanilides.

As esters of substituted or unsubstituted benzoic acid there may be mentioned, for example, 4-tert-butyl-phenyl salicylate, phenyl salicylate, octylphenyl salicylate, dibenzoylresorcinol, bis(4-tert-butylbenzoyl)resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate and 2-methyl-4,6-di-tert-butylphenyl 3,5-di-tert-butyl-4-hydroxybenzoate.

From the class of acrylates there may be mentioned, for example, ethyl α-cyano-β,β-diphenylacrylate, isooctyl α-cyano-β,β-diphenyl acrylate, methyl α-methoxycarbonylcinnamate, methyl α-cyano-β-methyl-p-methoxycinnamate, butyl α-cyano-β-methyl-p-methoxycinnamate, methyl α-methoxycarbonyl-p-methoxycinnamate and N-(β-methoxycarbonyl-β-cyanovinyl)-2-methylindoline.

A resorcinol monobenzoate is, for example, a compound of formula

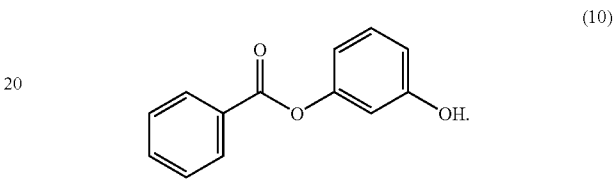

(10)

A formamidine is, for example, a compound of formula

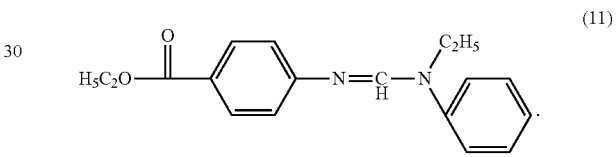

(11)

As UV absorbers it is also possible to use compositions comprising active methine compounds, such as, for example, unsubstituted or substituted malonate esters, as described, for example, in U.S. Pat. No. 6,207,740, WO-A-02/14418, EP-A-0 350 386, U.S. Pat. No. 4,661,566, U.S. Pat. No. 4,749,772 and EP-A-0 272 692.

Further suitable UV absorbers are α-[4-(2-cyano-3-ethoxy-3-oxo-1-propenyl)-2-methoxy-phenyl]-ω-hydroxy-poly(oxy-1,2-ethanediyl) and α-[4-(2-cyano-3-ethoxy-3-oxo-1-propenyl)-phenyl]-ω-hydroxy-poly(oxy-1,2-ethanediyl), and a mixture thereof.

The combination used according to the invention preferably comprises a UV absorber of formula

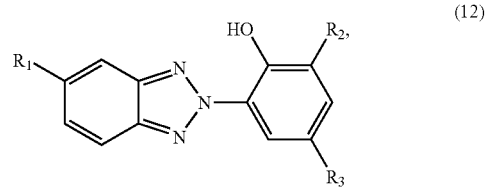

(12)

wherein
$R_1$ is hydrogen or halogen, preferably chlorine,
$R_2$ is $C_1$-$C_{12}$alkyl, preferably $C_1$-$C_6$alkyl which is unsubstituted or substituted by phenyl, and
$R_3$ is $C_1$-$C_{12}$alkyl, preferably $C_1$-$C_6$alkyl which is unsubstituted or substituted by phenyl.
$C_1$-$C_{12}$Alkyl and $C_1$-$C_6$alkyl as $R_2$ or $R_3$ can be linear or also branched from $C_3$.

The combination used according to the invention especially comprises one or more UV absorbers of formulae

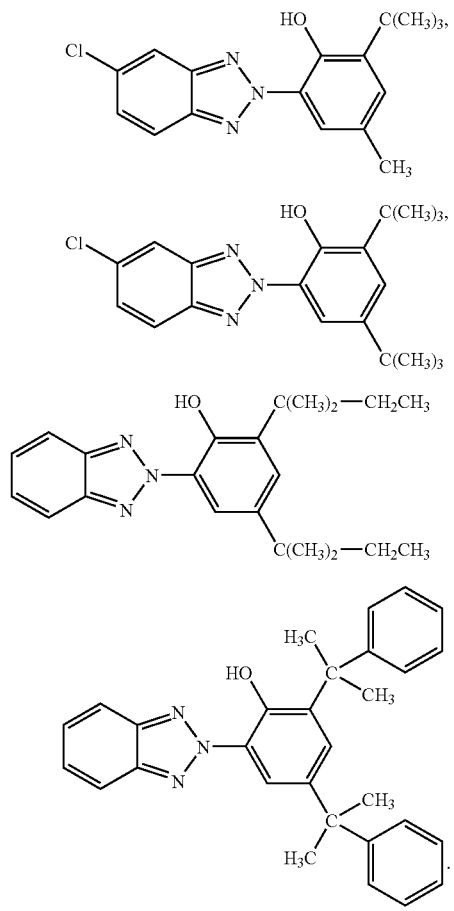

The amount of UV absorber can vary within a wide range, there being used advantageously from 0.01 to 1.0% by weight, especially from 0.02 to 0.6% by weight, more especially from 0.05 b is 0.4% by weight, of a UV absorber, based on the weight of the carrier material.

The compounds of formulae (1) to (16) are known and can be prepared by known processes in a manner known per se.

The carrier material suitable for the method according to the invention generally consists of glass or optionally transparent plastics films, plastics sheets, plastics containers for solid or liquid materials, made of high molecular weight organic material.

The high molecular weight organic materials suitable for the production of the plastics films or sheets are very generally polymers, such as, especially, polyesters (PES, PET), polycarbonate (PC), polystyrene (PS), polymethyl methacrylate (PMMA), polyamide, polyolefins such as polyethylene and polypropylene, polyvinyl chloride, ethyl butyl acrylate (EBA), polyvinyl butyrate (PVB), styrene/acrylonitrile (SAN) or acrylonitrile/butadiene/styrene (ABS).

Special preference is given to pure polyolefins such as polyethylene, polypropylene and polyisobutylene, and also substituted polyolefins such as polymerisation products of vinyl chloride, vinyl acetate, styrene, acrylonitrile, acrylic acid esters and/or methacrylic acid esters or butadiene, and also copolymerisation products of the mentioned monomers, especially ABS (acrylonitrile/butadiene/styrene) or EVA (ethylene/vinyl acetate).

The pigment preparation according to the invention is especially suitable for colouring pure or substituted polyolefins.

The pigment preparation according to the invention is especially suitable for colouring polyvinyl chloride and polyolefins, such as polyethylene and especially polypropylene. The pigment preparation according to the invention can be used for colouring all known kinds of polyolefin, such as LDPE, LLDPE (low density polyethylene) and HDPE (high density polyethylene), tPP (transparent polypropylene), metallocenes and clarified polypropylene.

The pigment preparation according to the invention is also suitable for colouring polyolefinic plastics fibres, especially polypropylene fibres.

In colorations, for example of polyvinyl chloride or polyolefins, the pigment preparation according to the invention is distinguished by good general pigment properties, such as good migration stability, heat stability, light stability and weather stability as well as good covering power and high colour strength, but particularly by good dispersibility with an especially low rub-off effect.

The method according to the invention is carried out, for example, by mixing one or more pigments of formulae (1) to (8) and a UV absorber into the plastics materials or polymeric colour particles intended for the production of plastics films or sheets, using extruders, roll mills or mixing or grinding apparatus, with the result that the pigments and the UV absorber are dissolved or finely dispersed in the high molecular weight material. The addition of the colour components of the combination used according to the invention and a UV absorber can be effected simultaneously, or in succession, in which case the order in which they are added can be selected as desired.

The plastics materials or polymeric colour particles treated in that way are then processed by methods known per se to form a film or a sheet or to form moulded articles, for example containers for solid or liquid substances, for example containers or bottles for drinks, or for pharmaceutical preparations, for example pills or drops.

The admixing of the pigments and optionally a UV absorber can also be carried out immediately before the actual processing step, for example by continuously feeding the colour components of the combination used according to the invention, a pulverulent UV absorber and a granulated or pulverulent high molecular weight organic material and optionally also additional ingredients, for example additives, simultaneously directly into the intake zone of an extruder, where mixing takes place just before processing. In general, however, it is preferable for the pigments used according to the invention or the combination used according to the invention to be mixed into the high molecular weight organic material beforehand.

It is often desirable, in order to reduce brittleness, to incorporate so-called plasticisers into the high molecular weight organic materials prior to production of the film. There may be used as plasticisers, for example, esters of phosphoric acid, phthalic acid or sebacic acid. In the method according to the invention the plasticisers may be incorporated in the polymers before or after the incorporation of the pigments used according to the invention or the combination used according to the invention. It is also possible, in order to achieve different shades of colour, to add to the high molecular weight organic materials, in addition to the pigments of formulae (1), (2), (3), (4), (5), (6) and (7) and (8), also further colorants in any desired amounts, optionally together with further additives, e.g. fillers or siccatives.

In a further embodiment of the method according to the invention, glass or existing trans-parent plastics film can be treated, for example, by spraying on or applying the pigments used according to the invention or the combination used according to the invention or by spraying on or applying, independently of one another, the colour components of the combination used according to the invention and a UV absorber, the spraying or application being carried out in any desired order.

The above-mentioned materials treated by the method according to the invention, especially materials made of polyolefins, are distinguished by very good in-use fastness properties, such as, especially, good light fastness and high-temperature light fastness.

The invention relates also to the use of pigments of formulae (1), (2), (3), (4), (5), (6) and (7) and (8), or a combination of the pigments of formulae (1), (2), (3), (4), (5), (6) and (7) and (8), and a UV absorber for protecting organic materials against light.

The carrier material treated with one or more pigments of formulae (1), (2), (3), (4), (5), (6) and (7) and (8) or with the combination according to the invention can be placed between the light source and the organic material to be protected in various ways.

The organic material to be protected can, for example, be wrapped in a plastics film treated with one or more of the pigments of formulae (1), (2), (3), (4), (5), (6) and (7) and (8) or with the combination according to the invention. The film produced in accordance with the invention can also be used, for example, for covering a greenhouse.

A further possibility is to apply one or more pigments of formulae (1), (2), (3), (4), (5), (6) and (7) and (8) or the combination according to the invention directly to, for example, glass windows, glass bottles, containers or packaging for pharmaceuticals and pharmaceutical preparations, to plastics windows or to cupboard doors made of glass or plastics, or to provide the glass or plastics windows or the cupboard doors made of glass or plastics with a plastics film treated with one or more pigments of formulae (1), (2), (3), (4), (5), (6) and (7) and (8) or with the combination according to the invention.

It is also possible for a direct light source, for example a neon tube, to be treated by application of one or more pigments of formulae (1), (2), (3), (4), (5), (6) and (7) and (8) or the combination according to the invention or by adhesive attachment of a plastics film treated with one or more pigments of formulae (1), (2), (3), (4), (5), (6) and (7) and (8) or with the combination according to the invention.

The following Examples serve to illustrate the invention. Unless otherwise indicated, in the Examples parts are parts by weight and percentages are percent by weight. Temperatures are given in degrees Celsius. The relationship between parts by weight and parts by volume is the same as that between grams and cubic centimeters.

EXAMPLE 1

Polypropylene (tPP=transparent polypropylene) injection-moulding:

1500.0 g of tPP type RD 360 MO from Borealis and
3.0 g of the pigment of formula

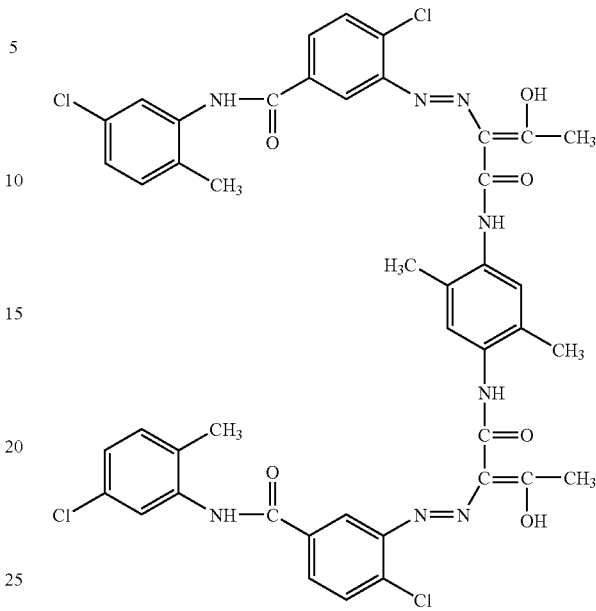

(1)

are weighed into a glass container and mixed for 10 minutes at 50 rev/min in a tumbler mixer.

Using a single-screw extruder LE 25/30 (I/D 30) from Labtech, the mixture is homogenised in melt form. (Temperature profile 160° to max. 200° C., screw speed 200 rev/min), and the extruded strand is granulated.

Injection-moulding: Ferromatik-FM 40 machine, step-wedge mould I*b*d1,d2,d3 90*36*0.5, 0.85, 1.5 mm.
Plastification temperature max 250° C.
Mould temperature cooling water 15-25° C.

EXAMPLE 1a

Polypropylene (tPP=transparent polypropylene) injection-moulding:
1500.0 g of tPP type RD 360 MO from Borealis and
3.0 g of the pigment of formula (1)

and 2.4 g of the UV absorber of formula

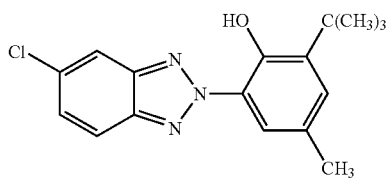

(13)

are weighed into a glass container and mixed for 10 minutes at 50 rev/min in a tumbler mixer.

Using a single-screw extruder LE 25/30 (I/D 30) from Labtech, the mixture is homogenised in melt form. (Temperature profile 160° to max. 200° C., screw speed 200 rev/min), and the extruded strand is granulated.

Injection-moulding: Ferromatik-FM 40 machine, step-wedge mould l*b*d1,d2,d3 90*36*0.5, 0.85, 1.5 mm.
Plastification temperature max 250° C.
Mould temperature cooling water 15-25° C.

EXAMPLES 2 TO 5

Analogously to the methods described in Examples 1 and 1a it is likewise possible to produce injection-mouldings containing the pigments of formulae (1), (2), (3), (5), (6) and the mixture of pigments of formulae (7) and (8).

EXAMPLE 6

LDPE (Low Density Polyethylene) blown film
1482.0 g of LDPE type 300E from DOW,
18.0 g of the pigment of formula (1) are weighed into a glass container.
Powder and melt mixing is effected analogously to Example 1.
Blown films: Labtech "Scientific" machine
Plastification temperature max. 220° C.
Extruder speed 70-80 rev/min
Ring nozzle temperature 230° C.
Melt throughput and supporting air pressure are regulated so that the tube dimension is about 0.075 mm.

EXAMPLE 6a

LDPE (Low Density Polyethylene) blown film
1482.0 g of LDPE type 300E from DOW,
18.0 g of the pigment of formula (1) and
2.2 g of the UV absorber of formula (13) are weighed into a glass container.
Powder and melt mixing is effected analogously to Example 1.
Blown films: Labtech "Scientific" machine
Plastification temperature max. 220° C.
Extruder speed 70-80 rev/min
Ring nozzle temperature 230° C.
Melt throughput and supporting air pressure are regulated so that the tube dimension is about 0.075 mm.

EXAMPLES 7 TO 10

Analogously to the methods described in Examples 6 and 6a it is likewise possible to produce blown films containing the pigments of formulae (1), (2), (3), (5), (6) and the mixture of pigments of formulae (7) and (8).

What is claimed is:
1. A method of protecting an organic material selected from pharmaceuticals and foodstuffs against light, which method comprises applying to or incorporating into a polypropylene or polyethylene film or sheet a pigment of formula (1)

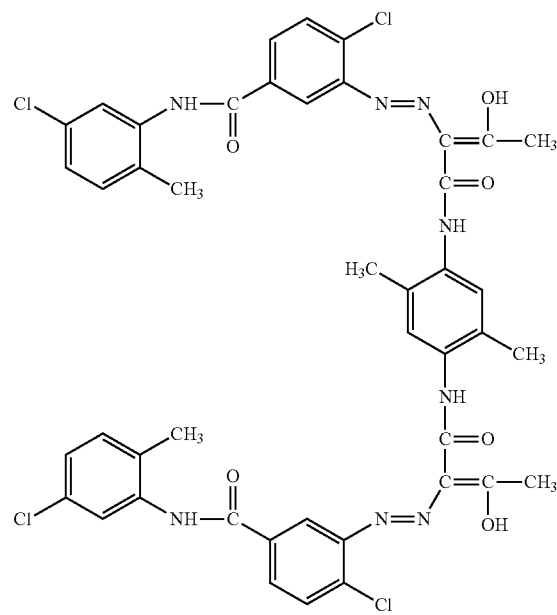

(1)

and optionally a UV absorber,
and positioning the film or sheet between the light source and the organic material to be protected.

2. The method according to claim 1, wherein a combination of a pigment of formula (1) and a UV absorber and optionally further pigments and/or colorants is applied to or incorporated into the film or sheet.

3. The method according to claim 2, wherein the UV absorber is selected from the group consisting of 2-(2'-hydroxyphenyl)benzotriazoles, 2-hydroxybenzophenones, esters of substituted or unsubstituted benzoic acid, acrylates, oxamides, 2-(2-hydroxyphenyl)-1,3,5-triazines, resorcinol monobenzoates, formamidines and a polyester UV absorber of formula (9)

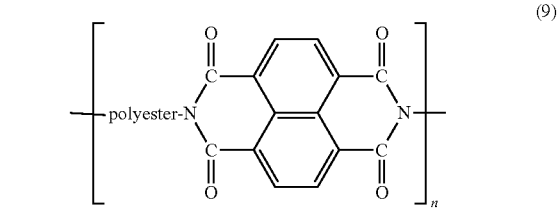

(9)

having a specific weight of from 1200 to 1400 at 25° C.

4. The method according to claim 2, wherein the UV absorber is of formula (13), (14), (15) or (16)

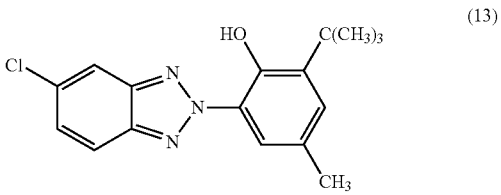

(13)

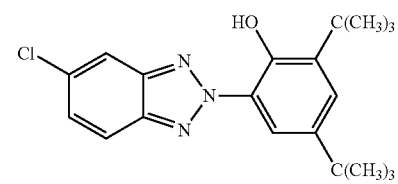 (14)
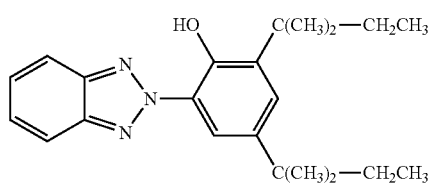 (15)
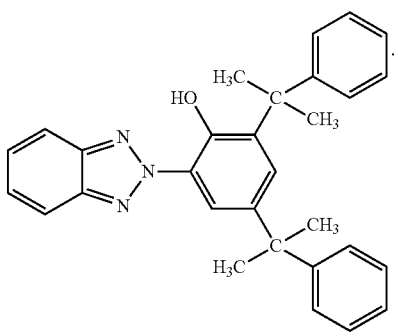 (16)
5. The method according to claim 1, wherein the organic material is a foodstuff.
6. The method according to claim 1, wherein the organic material is a pharmaceutical.
* * * * *